US011951750B2

(12) United States Patent
Bonet Lozano

(10) Patent No.: US 11,951,750 B2
(45) Date of Patent: Apr. 9, 2024

(54) SYSTEM FOR REGULATING INK INJECTOR SUPPLY IN A PRINT HEAD AND PRINTING EQUIPMENT INCLUDING SAME

(71) Applicant: UNITED BARCODE SYSTEMS, S.L., Vilassar de Mar (ES)

(72) Inventor: Antoni Maria Bonet Lozano, Vilassar de Mar (ES)

(73) Assignee: UNITED BARCODE SYSTEMS, S.L., Vilassar de Mar (ES)

( * ) Notice: Subject to any disclaimer, the term of this patent is extended or adjusted under 35 U.S.C. 154(b) by 108 days.

(21) Appl. No.: 17/906,210

(22) PCT Filed: Mar. 12, 2021

(86) PCT No.: PCT/EP2021/056372
§ 371 (c)(1), (2) Date: Sep. 13, 2022

(87) PCT Pub. No.: WO2021/180944
PCT Pub. Date: Sep. 16, 2021

(65) Prior Publication Data

US 2023/0117316 A1 Apr. 20, 2023

(30) Foreign Application Priority Data

Mar. 13, 2020 (EP) .................................... 20382189

(51) Int. Cl.
*B41J 2/18* (2006.01)
*B41J 2/175* (2006.01)

(52) U.S. Cl.
CPC ............. *B41J 2/18* (2013.01); *B41J 2/17596* (2013.01); *B41J 2202/12* (2013.01)

(58) Field of Classification Search
CPC ..... B41J 2/175; B41J 2/18; B41J 29/38; B41J 2/195; B41J 2/17596
See application file for complete search history.

(56) References Cited

U.S. PATENT DOCUMENTS

| | | | | |
|---|---|---|---|---|
| 6,079,633 | A | 6/2000 | Inoue et al. | |
| 10,195,865 | B2 * | 2/2019 | Pourtier | B41J 29/13 |
| 10,987,924 | B2 * | 4/2021 | Fischer | B41J 2/04573 |
| 11,433,683 | B2 * | 9/2022 | Meyer | B41J 2/17596 |
| 11,827,030 | B2 * | 11/2023 | Fischer | B41J 2/175 |
| 2010/0053253 | A1 | 3/2010 | Iwase et al. | |
| 2020/0047505 | A1 | 2/2020 | Kida et al. | |

FOREIGN PATENT DOCUMENTS

WO 2017190934 A1 11/2017

* cited by examiner

*Primary Examiner* — An H Do
(74) *Attorney, Agent, or Firm* — ICE MILLER LLP

(57) ABSTRACT

The present invention relates to a system for regulating ink injector supply in a print head, of the type installed in printing equipment and that use ink injectors which, by the installation of a measurement assembly parallel to the head and configured to emulate said print head, allows making an ink pressure measurement that does not require placing the ink system next to the head and prevents the use of pressure sensors with a wide range, using a single sensor without having to known the elevation of the head with respect to the system, nor the density of the liquid, or even the variation of viscosity with temperature.

7 Claims, 3 Drawing Sheets

SYSTEM FOR REGULATING INK INJECTOR SUPPLY IN A PRINT HEAD AND PRINTING EQUIPMENT INCLUDING SAME

CROSS-REFERENCE TO RELATED PATENT APPLICATIONS

This is a U.S. National Phase Application under 35 U.S.C. § 371 of International Patent Application No. PCT/EP2021/056372, filed Mar. 12, 2021, and claims priority to European Patent Application No. 20382189.7, filed Mar. 13, 2020, which is hereby incorporated herein by this reference in its entirety. The International Application was published on Sep. 16, 2021 as International Publication No. WO 2021/180944 A1.

The present invention relates to a system for regulating ink injector supply in a print head, of those installed in printing equipment that use ink injectors to eject the ink out of the head and onto the surface to print.

The invention also relates to a printing equipment that incorporates this type of ink supply regulation system and print head.

BACKGROUND OF THE INVENTION

To achieve the printing regularity, operation reliability and ink consumption economy goals, and among the various known printing systems, one of the most common configurations used is ink recirculation technology.

This recirculation system eliminates many of the regularity, reliability and economy drawbacks by making an ink flow pass continuously through the head from the corresponding supply reservoir to the return reservoir. This continuous flow allows carrying air bubbles present in the system and impurities not filtered in a first attempt or generated by a static system, where these problems are detrimental to the fulfilment of the intended goals.

In the conventional configuration of print heads with a recirculation ink supply system, the print heads normally use two ink manifolds, an inlet manifold connected to the ink inlet circuit of the head and an outlet manifold connected to the ink outlet circuit of the head, where these two manifolds are joined by microtubes that contain the injectors. With this recirculation the ink does not stop in the injectors and instead circulates through them from one manifold to the other, the injection chamber where the ink is ejected being disposed at the centre of these microtubules that communicate the inlet and outlet manifolds.

The supply system of the print heads is important in order to optimise the operation of this known recirculation system, and need to maintain the ink pressure in the head within a specified range to obtain good printing results. The pressure range for the ink flow is determined by the characteristics of the ink, the head type-model, and the physical characteristics of the operating environment of the printing equipment in which the head is fitted. Typically, head manufacturers arrange the head supply mechanism for a pressure to be maintained around −1.5 kPa at the head injectors.

To achieve this pressure the known head supply systems have a regulation system which can be of two types, according to the current state of the art. One of the systems used relies on the elevation difference between the two reservoirs of the system: the reservoir supplying ink to the head and the recirculation reservoir, where the difference in elevation between the two reservoirs is known and connection therebetween is established by gravity. As these values are fixed, the pressure of the ink when it passes through the injectors can be obtained.

In addition, a more complex system is known and used that provides greater freedom in the arrangement of the aforementioned reservoirs and a more precise control when parameters associated with the ink vary, such as the type or temperature thereof, but which requires two pressure sensors, one for each reservoir. These pressure sensors have the drawback that they must cover a wide range, and are thus not precise in their measurement.

Known systems use a pressure differential reading by means of two electrical transducers, which implies the drawback of measuring differential pressures electrically. Although this is not difficult in itself, it does suffer from an intrinsic defect of the sensors themselves consisting of hysteresis, normally measured with reference to the base of the scale which leads to a false measurement and lack of linearity.

To minimise or control this problem in known configurations it is necessary to use an arrangement that minimises the distances between the ink supply system and the head. Although this arrangement and the distances between the ink supply system and the head depend on the characteristics of the ink and the connection conduct, normally beyond a distance of 20-30 cm the measurement range of the sensors becomes high compared to the pressures measured.

As can be seen both systems imply a rigidity in the design of the hydraulic supply system which requires a specific and fixed configuration of the reservoirs in order to know in an efficient and valid manner the ink pressure in the injectors and be able to regulate it in to keep it at the desired values.

Thus, a configuration is needed for a system for measuring the ink pressure in the injectors that is reliable and more flexible in the design requirements within the head ink supply system.

DESCRIPTION OF THE INVENTION

The aim of the present invention is to obtain a system for regulating the supply of the ink injectors in a print head, as well as a printing equipment that uses said system, that manage to overcome the aforementioned drawbacks, while presenting further advantages as described below.

With regard to the terminology and concepts indicated in the present description, the following applies:

- references to elevation distances must be taken as distances along the vertical axis, as the axis of influence of the liquid column in the system, and any change in the orientation of a possible modification in the invention must consider the use of this terminology for such purpose;
- the use of the term identical implies a position or condition equal to the reference one, although allowing for minor variations that do not have a significant effect in an embodiment in which there is a minor variation with respect to the position or condition of reference;
- the term injection chamber refers at least to the central area in which the injectors through which the ink is ejected to the support or surface are present;
- the reference to the injector supply system must be understood to be complemented with the conventional components that are not a specific subject matter of this invention and the advantageous configurations described herein, such as the connections to the ink supply reservoirs, their pumping/suction system, the filters, stabilizers, etc. normally used and which form part of the conventional art.

According to the aforementioned aim, according to a first aspect, the present invention relates to a system for regulating the ink supply to the injectors of a print head with an ink recirculation system.

In a characterising manner the regulation system comprises at least a measuring assembly installed in parallel flow of ink to the injection head, emulating the conditions of this injection head, where the measurement assembly of the regulation system comprises at least:

- a pressure measurement point to which a pressure sensor is connected;
- a first connection of the pressure measurement point in the ink supply inlet circuit of the print head; and
- a second connection of the pressure measurement point in the ink supply outlet circuit of the print head.

In this respect, also in a characterising manner, the first and second connections of the measurement point in each of the parts of the ink supply circuit have identical characteristics of hydraulic resistance to the ink flow.

This advantageous configuration allows making a measurement that does not need to place the ink system next to the head and avoids the use of pressure sensors with a wide range, which allows a greater precision of measurement, simply by having the same resistance to flow in the segments before and after the measurement point. In addition, the measurement can be made with a single sensor and in a simple manner, as it does not require knowing the elevation at which the head is located with respect to the system to perform the regulation, nor to know the density of the liquid or even the variation in viscosity with temperature. All of these parameters imply changes in the system pressure; advantageously in the present invention, these possible variations are reflected virtually by the measurement point of the measurement assembly, and therefore immediately compensated by the regulation system and its control system.

With regard to the hydraulic resistance to flow of the connections of the measurement point in each of the parts of the ink supply circuit, using an electrical simile each of these segments has a significant resistance to the passage of ink, so that one can say that the two connection segments of the measurement point are equivalent to two identical resistances joined at the centre where the measurement point is located. The measurement assembly segments installed in parallel to the injection head emulate the segments of the injector conduct between the conventional inlet and outlet connectors but in a parallel flow of ink, which respectively connect with the ink supply inlet circuit of the print head and the ink outlet circuit of the print head.

It should be considered that typically these ink supply systems supply ink to print heads with a vertical or horizontal orientation. This orientation refers to the plane generated by the position of the injectors, which is generally parallel to the print support/orifice.

Preferably, the pressure measurement point is placed at an elevation identical to the elevation of the central area in which the injectors are placed.

Alternatively, the pressure measurement point is located at the lowest possible elevation with respect to the elevation of the central area in which the injectors are placed, with respect to the geometry and physical configuration of the connections to the inlet and outlet of the ink supply circuit.

Thus, although the ideal configuration for measurement is to have the pressure measurement point at the same elevation as the injectors, alternatively some elevation difference is possible, preferably minimal, for an effective measurement, the position of the measurement assembly being constrained by the internal spaces of the equipment and the slightly external location of the print head.

In this regard, in one embodiment of the invention the elevation of the measurement point of the measurement assembly installed parallel to a print head with a vertical orientation corresponds to the mean elevation of the various injectors arranged vertically in the print head.

In addition, in an alternative embodiment of the invention the elevation of the measurement point of the measurement assembly installed parallel to a print head with a horizontal orientation corresponds to the elevation of any of the injectors in the print head, as it is an elevation defined by the horizontal arrangement of the injectors.

This allows eliminating or minimising to make negligible any minimal elevation differences of the liquid at the measurement point with respect to the elevation of the liquid in the injectors.

Preferably, each connection of the measurement point to each of the parts of the ink supply circuit includes at least one or more conduct segments and connection elements to the supply circuit, where the hydraulic resistance to ink flow from the point of connection of the measurement assembly at the ink inlet circuit of the print head to the pressure measurement point is identical to the hydraulic resistance to ink flow from the pressure measurement point to the connection point of the measurement assembly at the supply outlet circuit of the print head.

This enables obtaining a measurement at the measurement point with a pressure sensor that emulates the pressure that would have been obtained directly at the injector. The hydraulic resistance to flow at the segments located on either side of the measurement system must have the same physical characteristics, as their identical value is what determines the accuracy of the measurement and the resulting regulation.

The segments included in the measurement assembly in the form of constrictions or strangulations are large enough not to constitute a risk of blocking while small enough not to result in a high ink consumption. Typically in current embodiments it has been determined empirically that a range of 1% to 10% of the flow admitted by the print head allows meeting said requirements. The upper limit is not a parameter that is detrimental to the features, since the larger it is the lower the pressure fluctuations in the head and therefore the more effective the regulation will be.

Preferably, the ink supply system for the injectors has a control system that receives information from the pressure measurement assembly by the pressure sensor at the measurement point, regulating the pressure in the ink recirculation circuit according to predetermined parameters by acting on the ink pumping/suctioning means.

This allows an effective and simple regulation, and increases the flexibility in the design of the ink supply system.

Also according to the aim of the invention and according to a second aspect thereof, the present invention is based on an ink printing equipment of the type that print the ink on a surface or support and are formed by at least one ink supply system to at least one print head, with the advantageous feature that this ink printing equipment is provided with a system for regulating ink supply to the injectors as indicated in the aforementioned features, in the first aspect of the invention.

BRIEF DESCRIPTION OF THE DRAWINGS

For the better understanding of the description made herein, a set of drawings has been provided wherein, schematically and solely by way of a non-limiting example, a practical case of an embodiment is portrayed.

DESCRIPTION OF A PREFERRED EMBODIMENT

Various embodiments of the present invention of a system for regulating supply to the ink injectors of a print head are described below, as well as of the printing equipment including same, with reference to the aforementioned figures.

Figure 1:
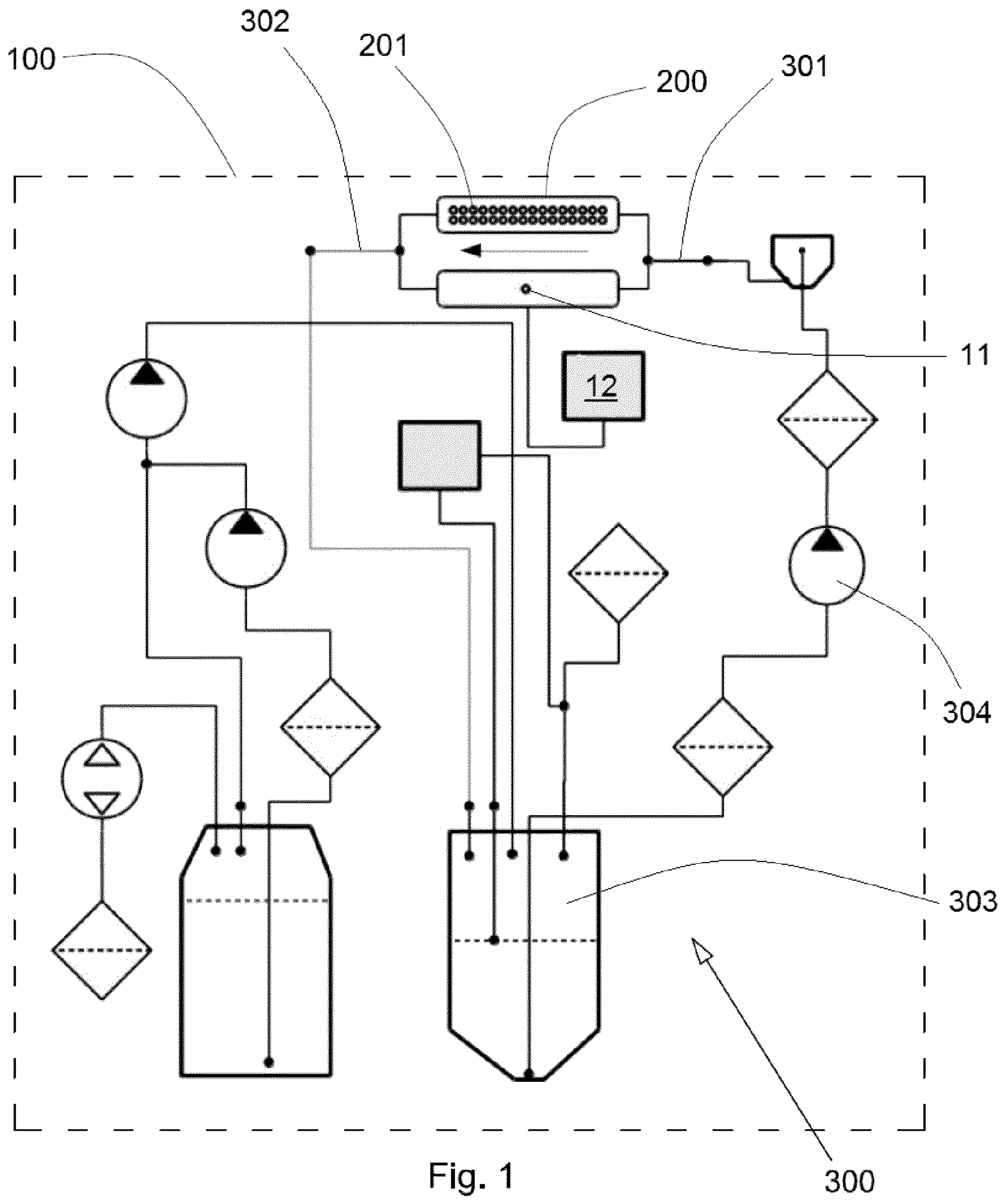
FIG. 1 is a schematic view of a possible operation scheme for a supply system in which the measurement assembly is integrated, showing the pumps, auxiliary reservoirs, filters, stabilizers etc. that form part of the supply system but which are not part of the specific novel features of the invention as they are known conventionally, yet do form part of the system in which the invention is integrated.

According to the present invention, as can be seen in FIG. 1, the preferred embodiment of the invention is based on an ink printing equipment (100) that is provided with a horizontally arranged print head (200) and injectors (201) fed by an ink supply system (300), which is provided with an ink regulation system with recirculation through said injectors (201).

The heads are fed by an ink inlet circuit (301) which supplies ink, according to the present embodiment, to a first manifold (202) for ink inlet to the injection chamber of the head (200), a second manifold (203) arranged for ink outlet from the injection chamber of the head (200) that opens into the outlet (302) and return circuit of the ink to the reservoir (303).

Between each manifold (202, 203) are conducts that communicate them, the ink ejection injector (201) being located at the central area of each conduct.

Figure 2A:
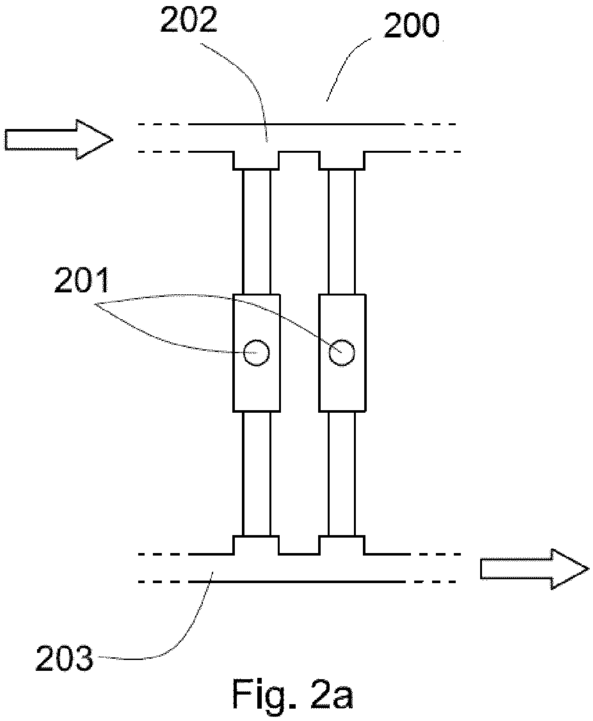
FIGS. 2*a* and 2*b* are respectively a partial side view of a head showing the manifolds and the conducts containing the injectors and a schematic view of the measurement assembly with the measurement point at the central area and the connection elements to the manifold.
Figure 2B:
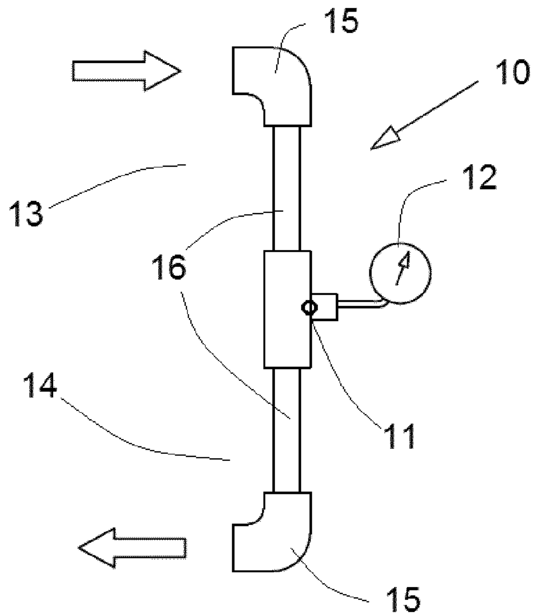
Figure 3:
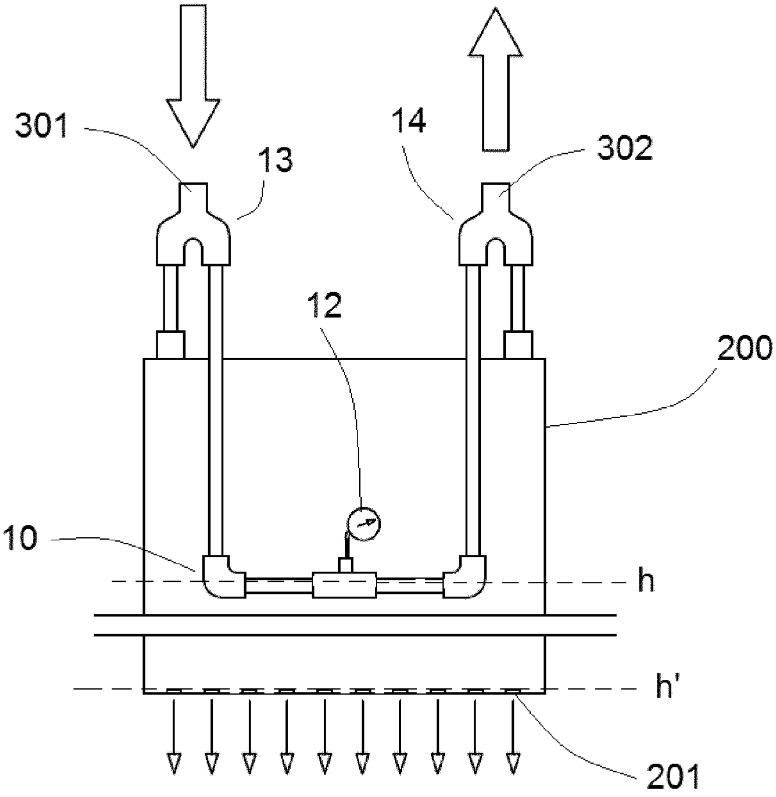
FIG. 3 is an upper plan view of a print head with a horizontal orientation.

As can be seen in FIGS. 1, 2 and 3, connected on one side to the inlet circuit (301) and one the other to the outlet circuit (302) of the head (200), and therefore in a parallel flow of ink to same, is a measurement assembly (10) that forms part of the supply regulation system and that includes a measurement point (11).

This measurement point (11) emulates the pressure conditions of the injectors (201) such that it has a measurement point (11) at the central part of said communication between the inlet circuit (301) and the outlet circuit (302). The measurement point (11) has a connection to a pressure sensor (12) to obtain this pressure and supply the data to the supply regulation system.

The segments (13, 14) of the conduct before and after the measurement point (11) have the design requirement that the first connection segment (13) of the pressure measurement point (11) to the inlet circuit (301) for ink supply to the print head (200), and the second connection segment (14) of the pressure measurement point (11) to the outlet circuit (302) for ink supply to the print head (200), must have identical characteristics of hydraulic resistance to ink flow in each one (13, 14).

In the present preferred embodiment, as shown in FIG. 3, the pressure measurement point (11) emulates a horizontally-arranged print head (200), and thus said measuring point (11) is at an elevation (h) identical to the elevation (h') defined approximately by all the injectors (201) of the head (200).

The location of the elevation (h) of the measurement point (11) can vary and not be identical to the elevation (h') of the injectors (201), normally due to problems of available space in the connection of the inlet circuit (301) and the outlet circuit (302), and to the external location of the injectors (201), but this variation must be minimised so that the measurement is as correct as possible. Alternatively, the measurement point could be placed at a different elevation, although this will lower the accuracy of the measurement obtained.

Figure 4:
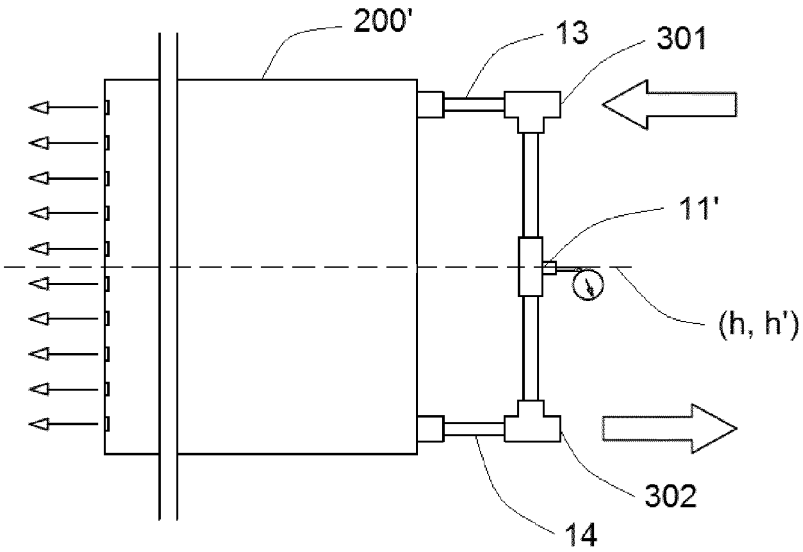
FIG. 4 is a side plan view of a print head with a vertical orientation.

In this regard, and alternatively, if the head (200') has a vertical orientation, as can be seen in FIG. 4, the pressure measurement point (11') emulates a print head (200') with a vertical orientation, and is therefore located at an elevation (h) identical to the elevation (h') approximately resulting from the mean of the elevations at which the injectors (201') are distributed in the head (200').

Each connection segment (13, 14) of the measurement point (11) to each of the corresponding parts of the ink supply circuit (301, 302) includes a connection element (15) to the supply circuit and a conduct (16), in the form of a narrowing, where this narrowing is formed by a capillary with a cross-section diameter of 1 mm.

As indicated this configuration must comply with the requirement that the segment (13) before and the segment (14) after the measurement point (11) have identical hydraulic resistance to flow. To this end in the present embodiment the two segments (13, 14) have the same physical characteristics, lengths and sizes.

The pressure at the measurement point (11) is obtained by a pressure sensor (12) that automatically supplies this information, according to any of the conventional communication means known, to the system for regulating ink supply to the head (200), which allows obtaining accurate information on the ink pressure at the injectors (201) of the print head (200) by emulating the conditions thereof at the measurement point (11) and allowing to regulate the pressure of the supply ink.

Regulation is performed in view of the parameters assigned for specific printing conditions, determined by the characteristics of the ink, temperature, support, etc. by acting on the actuation elements of the supply system (300), mainly on the pumping devices (304).

Despite the fact that reference has been made to a specific embodiment of the invention, it is evident for a person skilled in the art that the system for regulating ink supply to the injectors of a print head, as well as the printing equipment including same, as described are susceptible of numerous variations and modifications, and that all the aforementioned details can be replaced by other technically equivalent ones without detracting from the scope of the protection defined by the attached claims.

The invention claimed is:

1. A system for regulating ink supply to injectors of a print head with ink recirculation system, characterised in that the system for regulating ink supply comprises at least one measurement assembly installed parallel to the flow of ink to the injection head emulating the conditions of said injection head, where the measurement assembly of the system for regulating ink supply comprises at least:

a pressure measurement point to which a pressure sensor is connected;

a first connection of the pressure measurement point in an ink supply inlet circuit of the print head; and a second connection of the pressure measurement point in an ink supply outlet circuit of the print head;

where the first and second connections of the measurement point to each of parts of an ink supply circuit have identical characteristics of hydraulic resistance to ink flow; and where each connection of the measurement point to each of the parts of the ink supply circuit includes at least one or more conduct segments and connection elements to the ink supply circuit, where the hydraulic resistance to ink flow from the point of connection of the measurement assembly at the ink inlet circuit of the print head to the pressure measurement point is identical to the hydraulic resistance to ink flow from the pressure measurement point to the connection point of the measurement assembly at the supply outlet circuit of the print head.

2. The system for regulating ink supply to the injectors of a print head, according to claim 1, where the pressure measurement point is located at an elevation identical to the elevation of the central area in which the injectors are placed.

3. The system for regulating ink supply to the injectors of a print head, according to claim 1, where the pressure measurement point is placed at an elevation identical to the elevation of the central area in which the injectors are placed.

4. The system for regulating ink supply to the injectors of a print head, according to claim 1, where the elevation of the measurement point of the measurement assembly installed parallel to a print head with a vertical orientation corresponds to the mean elevation of the various injectors distributed vertically in the print head.

5. The system for regulating ink supply to the injectors of a print head, according to claim 1, where the elevation of the measurement point of the measurement assembly installed parallel to a print head with a horizontal orientation corresponds to the elevation of any of the injectors in the print head, as this elevation is defined by the horizontal distribution of the injectors.

6. The system for regulating ink supply to the injectors of a print head, according to claim 1, where the ink supply system for the injectors has a control system that receives information from the pressure measurement assembly by the pressure sensor at the measurement point, regulating the pressure in the ink recirculation circuit according to predetermined parameters by acting on the ink pumping/suctioning means.

7. An ink printing equipment of the type that print ink on a surface or support and formed by at least one ink supply system to at least one print head, characterized in that the print head comprises the system for regulating the ink supply of the injectors in claim 1.

* * * * *